Oct. 25, 1932.　　　D. B. REPLOGLE　　　1,884,869

METHOD OF MAKING PIPE SECTIONS

Original Filed Aug. 2, 1924

Inventor
D. B. Replogle
By Munson H. Lare
Attorney

Patented Oct. 25, 1932

1,884,869

UNITED STATES PATENT OFFICE

DANIEL BENSON REPLOGLE, OF BERKELEY, CALIFORNIA, ASSIGNOR, BY DIRECT AND MESNE ASSIGNMENTS, TO THE COMMERCE GUARDIAN TRUST & SAVINGS BANK, TRUSTEE, OF TOLEDO, OHIO

METHOD OF MAKING PIPE SECTIONS

Original application filed August 2, 1924, Serial No. 729,759. Divided and this application filed June 8, 1931. Serial No. 542,941.

The invention relates to improvements in making pipe sections suitable for forming an angular joint, and according to the preferred embodiment of the invention, comprises the steps of cutting off a length of pipe angularly, and then reducing the elliptical cut-off end of the pipe to cylindrical form, the axis of the cylinder being substantially at right angles to the plane of the cut end.

The invention will be described in particular reference to the making of joints in fluid-carrying pipes, preferably of plain cylindrical pattern, in which the aim is to secure the benefits of flexibility in fluid-carrying pipes or conduits constructed of semi-rigid or ductile materials such as metals and semi-plastics.

The present application is a division of my application Serial No. 729,759, filed August 2, 1924 (now Patent No. 1,836,336, granted December 15, 1931) in which earlier application the invention relates to joints in fluid-carrying pipes and the method of forming said joints.

The present invention will be described by reference to the accompanying drawing, which illustrates the application of the invention to the making of pipe joints. In the drawing, Fig. 1 shows a longitudinal cross-section of two like or similar pieces or sections of thin-walled pipe, joined at their ends according to my invention, the ends joined having first been cut off at an angle of twenty-two and a half degrees each, from a perpendicular to the line of the axes;

Figs. 2 and 3 show respectively an edge and a plan view of the elliptical figure produced by cutting transversely through a round pipe, the first step in preparing one of the pipe ends to be joined as shown in Fig. 1;

Figs. 4 and 5 show the same part as Figs. 2 and 3, but after the metal edge of the elliptical figured end has been reduced, by swaging, to a cylindrically shaped rim, of a circumference substantially equal to the perimeter of the elliptical end from which it has been formed, and having a diameter that is a mean proportional, substantially, between the major and minor axes of the said elliptical metal end;

Fig. 8 is a perspective of a flattened wire or other strip suitable for padding between the flat sliding surfaces of ring members before referred to;

Figures 10, 12:
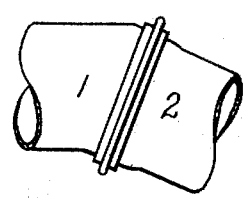
Fig. 10 is a view similar to Fig. 9, except that the sections have been turned only half as far.
Figure 11:
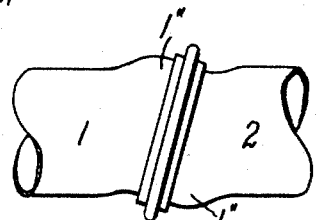

Fig. 11 represents sections of pipe joined according to my invention, wherein the axes of the several joined portions are brought to coincidence by a special forming of the circular rims before securing together by the sliding ring joint, and when the sections are turned to the parallel position with respect to each other; and Fig. 12 is a section view of a modified joint wherein flanges are formed integral with the pipe ends, and a separate ring is employed for sealing the flanges in rotary sliding contact.

Referring more particularly to the drawing, it is to be understood that the parts or sections 1 and 2 to be joined are here shown as being alike and straight, though they may be of greatly varying forms in practice. The essential feature for getting the results aimed at is that the ends to be joined be brought to conform to a circle lying in a plane cutting the axis of at least one of the parts or sections at an other than right angle and that said parts be of swageable material. The sloping edge 1' is then reduced to a cylindrical rim 3 designed to fit either into or over the corresponding rim 4 or 4' of the sliding joint ring, where it is to be permanently secured by welding or otherwise.

Figure 1:
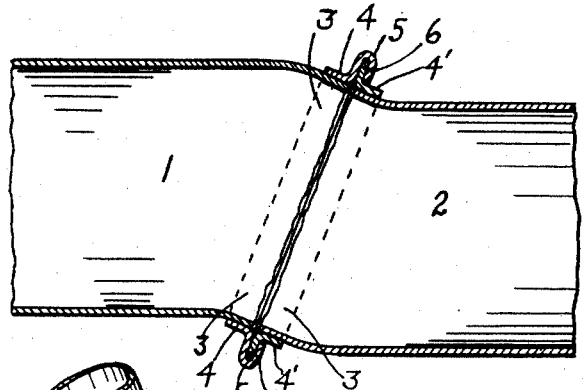
Figures 2, 3:
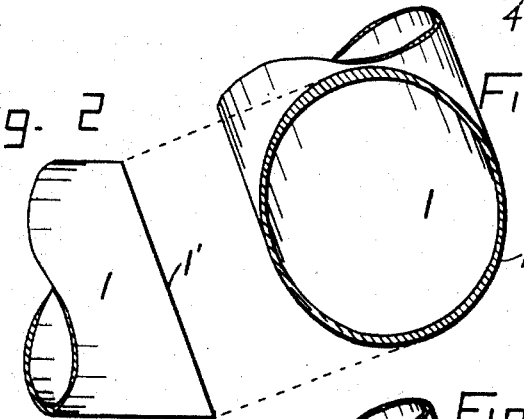
Figure 6:
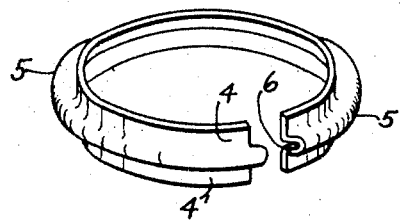
Fig. 6 is a view in perspective, with parts broken away, showing the details of construction of an assembled sliding ring adapted for securing together the ends of the pipe sections to be joined according to my invention.
Figures 4, 5:
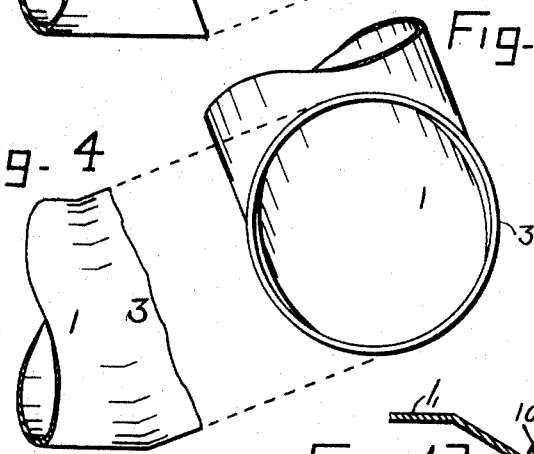
Figure 7:
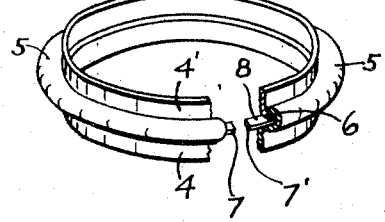
Fig. 7 is a substitute or alternative form of the ring shown in Fig. 6, wherein an annular padding is interposed between the sliding surfaces of the two principal members of the ring.
Figure 8:
Figure 9:
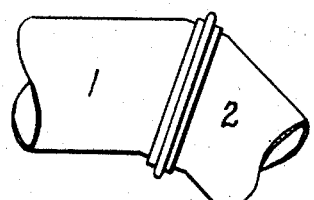
Fig. 9 is a reduced size view of pipe ends joined as shown in Fig. 1, but where the sections have been turned 180 degrees with respect to one another, from the position or relation shown in the first figure.

The ring members are preferably stamped out from discs, the member having the encompassing flange 5 being made from a larger size disc than the member having the encompassed flange 6. The encompassing flange 5 may be made large enough to include one or more paddings 8 in addition to the annular flange 6 within its fold, but it is not to be closed tightly down on the encompassed parts. They are to fit against unnecessary leaking, but to permit of a rotary sliding movement, each upon each, whereby the parts or sections to be joined may readily be brought into varying angular relations with each other by twisting or turning, with reference to each other. To secure against too much looseness or rattling of the swivel joint thus made, the padding rings 8 to be used may have the ends 7 and 7' thereof staggered so as to have a slight springing yield, yet firmly holding the annular faces of the encompassing and encompassed flanges against leakage. A particular feature of the improved joint thus produced is that the fluid pressure within the pipe or without the pipe having the joint, tends to press the flanges of the joint into greater sealing contact rather than separate them and cause leaking. This is apparent on reference to Fig. 1. Internal pressure tends to spread the abutting pipe ends diametrically outward, causing them to bind in the rings if they yield. Should fluid under pressure enter from within the pipes between flange 6 and the left-hand portion of flange 5, it would draw the free or right-hand portion of flange 5 against flange 6. External pressure would tend to cause flange 5 to pinch flange 6. Should fluid from without enter under the free edge of flange 5 and occupy the space between the lip or free portion of flange 5 and flange 6, the pressure against the lip would tend to draw the left-hand portion of flange 5 against flange 6. In any case the joint would be more tightly sealed than it would be in the absence of pressure.

Where it is desired to align the several sections of a conduit or pipe having this form of swivel or sliding joint, a bend 1'' as shown in Fig. 11 off-setting the flanged rim 3 is required.

It is apparent, of course, that except for the difficulties of construction, the encompassing and encompassed flanges of the sliding ring element might be integrally constructed by overturning and swaging the cut-off exposed edges of the body of the conduit or pipe sections as shown in Fig. 12. It is not intended here to exclude such construction from the scope of the invention, but to give one of the alternate equivalent constructions that simplifies getting the result attained. Also, each section of pipe may be provided with a simple out-turning flange as shown in Fig. 12, and the two flanges then brought face to face and encompassed by a U-sectioned encompassing ring constructed independently of each; and this latter arrangement is applicable, of course, also where the sliding joint ring elements are first made independent of the pipe sections to be joined.

Swaging to cylindrical rim form, of the elliptical ends of the diagonally cut-off pipes, is accomplished by forcing them in a heated or semi-soft condition, into a suitable form or die.

In Fig. 12 the reference numerals 1' and 2' denote fragmentary portions of the pipes to be joined, and these pipes are provided with abutting upstanding annular flanges 10—10, which are held in sealed relation by the encompassing ring 5'.

What I claim is:

The method of making a pipe section suitable for an angular joint which consists in cutting off a length of pipe angularly and then reducing the elliptical cut-off pipe end to cylindrical form of substantial length, the axis of the cylinder being rectilinear and substantially at right angles to the plane of the cut end, whereby the cylindrical end may be fitted to rotate within another straight cylinder the internal diameter of which is the same as the external diameter of the cylinder at the cut-off end of the pipe.

In testimony whereof I affix my signature.

DANIEL BENSON REPLOGLE.